(12) United States Patent
Koga

(10) Patent No.: US 12,301,917 B2
(45) Date of Patent: May 13, 2025

(54) PROCESSING APPARATUS TO INITIALIZE SETTINGS, CONTROL METHOD FOR PROCESSING APPARATUS, AND STORAGE MEDIUM

(71) Applicant: CANON KABUSHIKI KAISHA, Tokyo (JP)

(72) Inventor: Kazuhiro Koga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 18/190,746

(22) Filed: Mar. 27, 2023

(65) Prior Publication Data

US 2023/0328304 A1 Oct. 12, 2023

(30) Foreign Application Priority Data

Apr. 8, 2022 (JP) ................................ 2022-064569

(51) Int. Cl.
*H04N 21/4223* (2011.01)
*H04N 5/765* (2006.01)
*H04N 23/661* (2023.01)

(52) U.S. Cl.
CPC ......... *H04N 21/4223* (2013.01); *H04N 5/765* (2013.01); *H04N 23/661* (2023.01)

(58) Field of Classification Search
CPC .. H04N 21/4223; H04N 5/765; H04N 23/661; H04N 23/65
See application file for complete search history.

(56) References Cited

U.S. PATENT DOCUMENTS

| 10,148,860 | B2 * | 12/2018 | Yokomizo | G06F 3/04842 |
| 2014/0211239 | A1 * | 7/2014 | Onishi | H04N 1/0001 358/1.14 |
| 2014/0300200 | A1 * | 10/2014 | Ito | H02J 50/80 307/104 |
| 2016/0173645 | A1 * | 6/2016 | Okuhara | H04N 21/4117 709/218 |
| 2017/0094225 | A1 * | 3/2017 | Morita | H04L 12/1822 |
| 2020/0186586 | A1 * | 6/2020 | Tokunaga | H04L 67/60 |
| 2021/0152731 | A1 * | 5/2021 | Wakamatsu | H04N 23/61 |

FOREIGN PATENT DOCUMENTS

| JP | 2008011004 | A | | 1/2008 | |
| JP | 2020025248 | A * | | 2/2020 | ............. H04N 23/61 |
| WO | WO-2020026903 | A1 * | | 2/2020 | ............. H04N 23/61 |

* cited by examiner

*Primary Examiner* — Padma Haliyur
(74) *Attorney, Agent, or Firm* — Canon U.S.A., Inc., IP Division

(57) ABSTRACT

A processing apparatus includes one or more processors, and one or more memories including instructions stored thereon that, when executed by the one or more processors, causes the processing apparatus to function as a communication unit configured to perform network communication, a video image output unit configured to output video images, and a control unit configured to perform control including control to output video images from the video image output unit, wherein the control unit performs control to output the video images from the video image output unit based on a status of settings of information to be used at time of login to the processing apparatus and a status of the network communication.

11 Claims, 6 Drawing Sheets

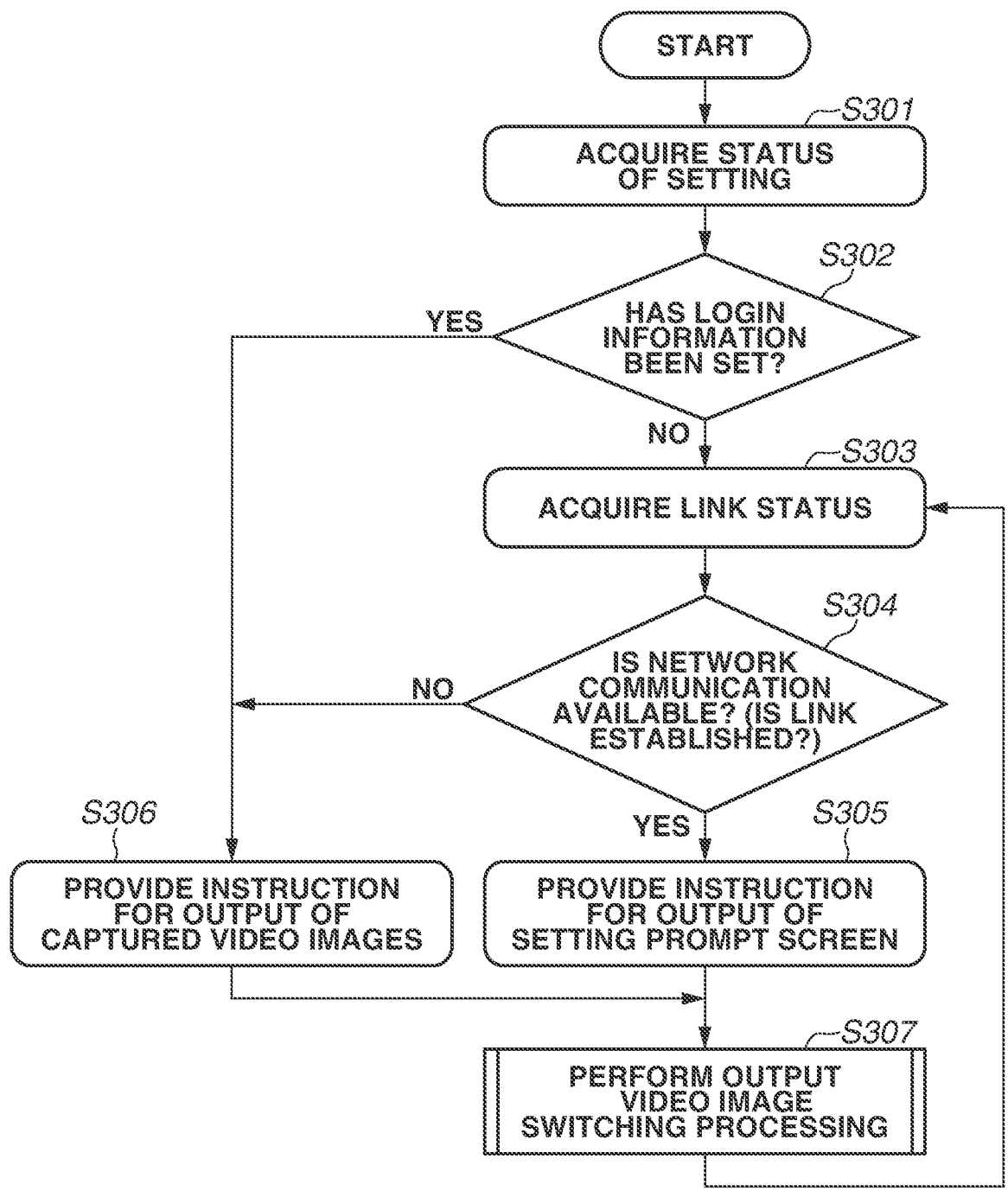

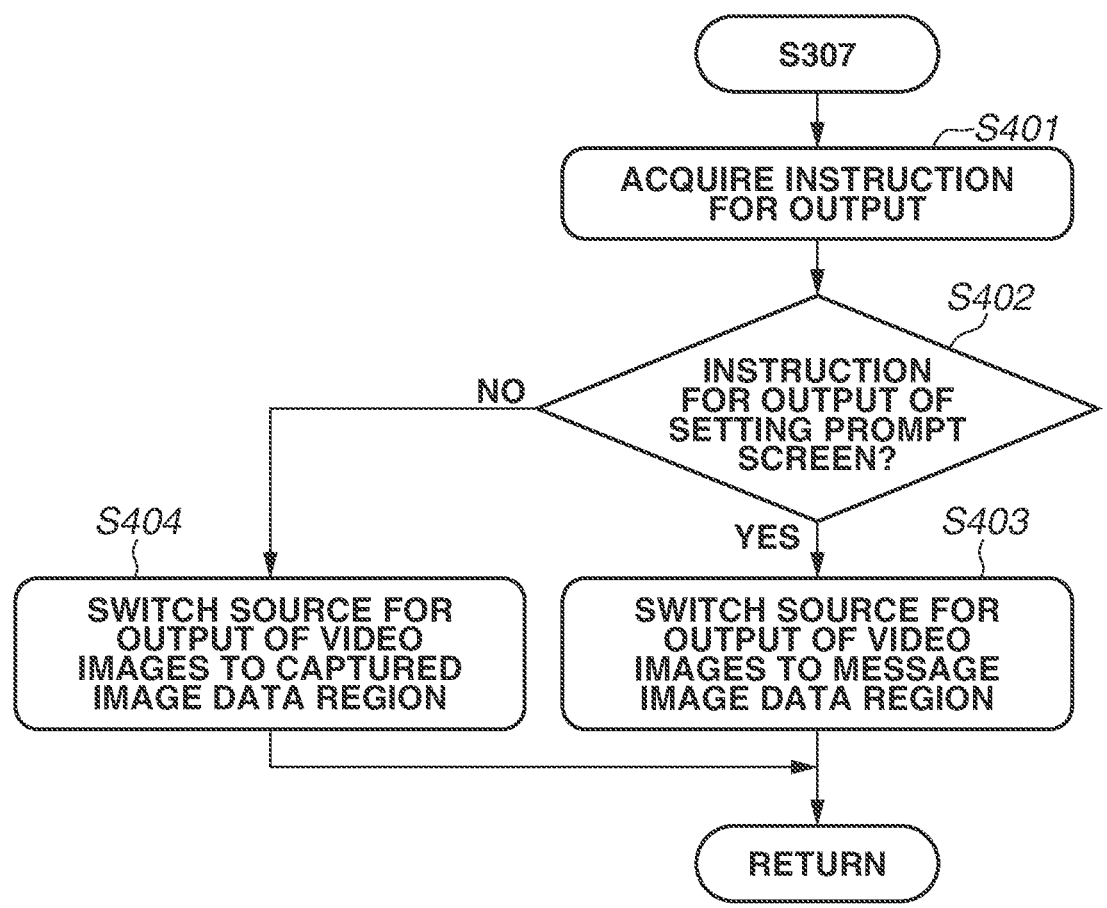

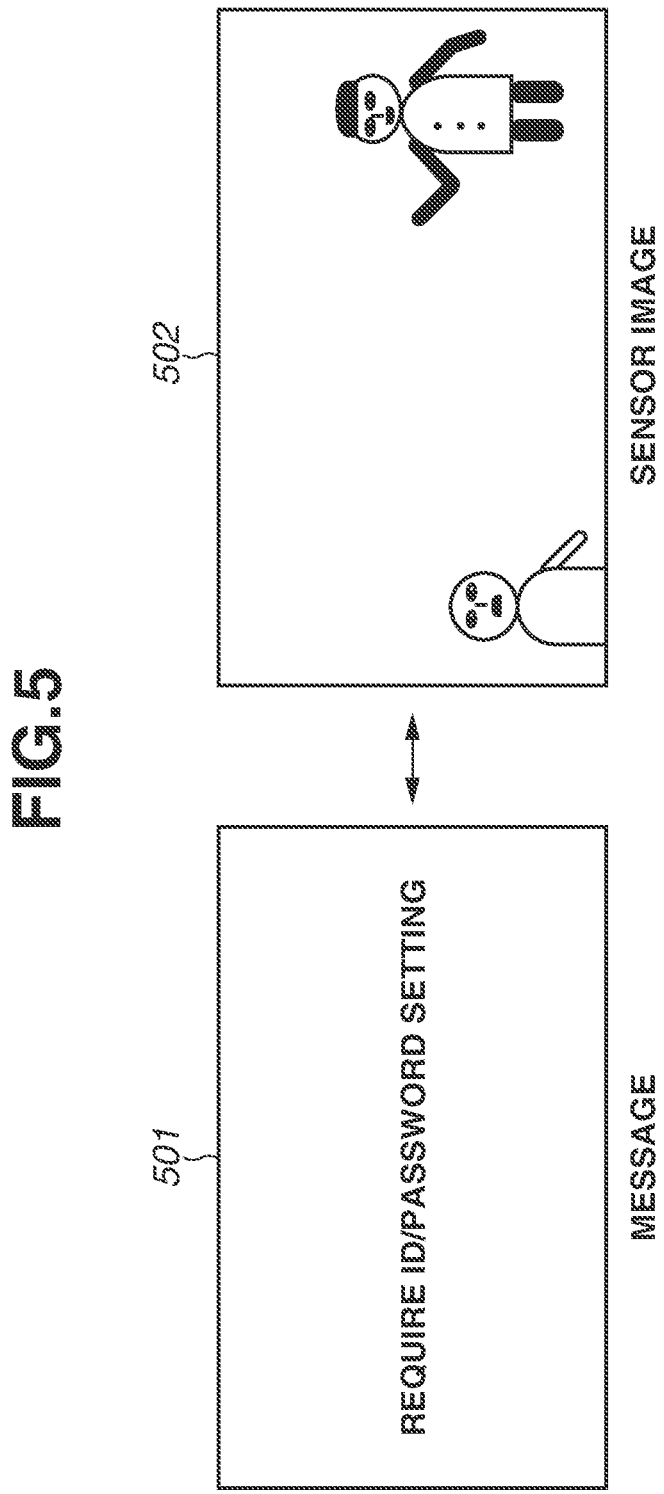

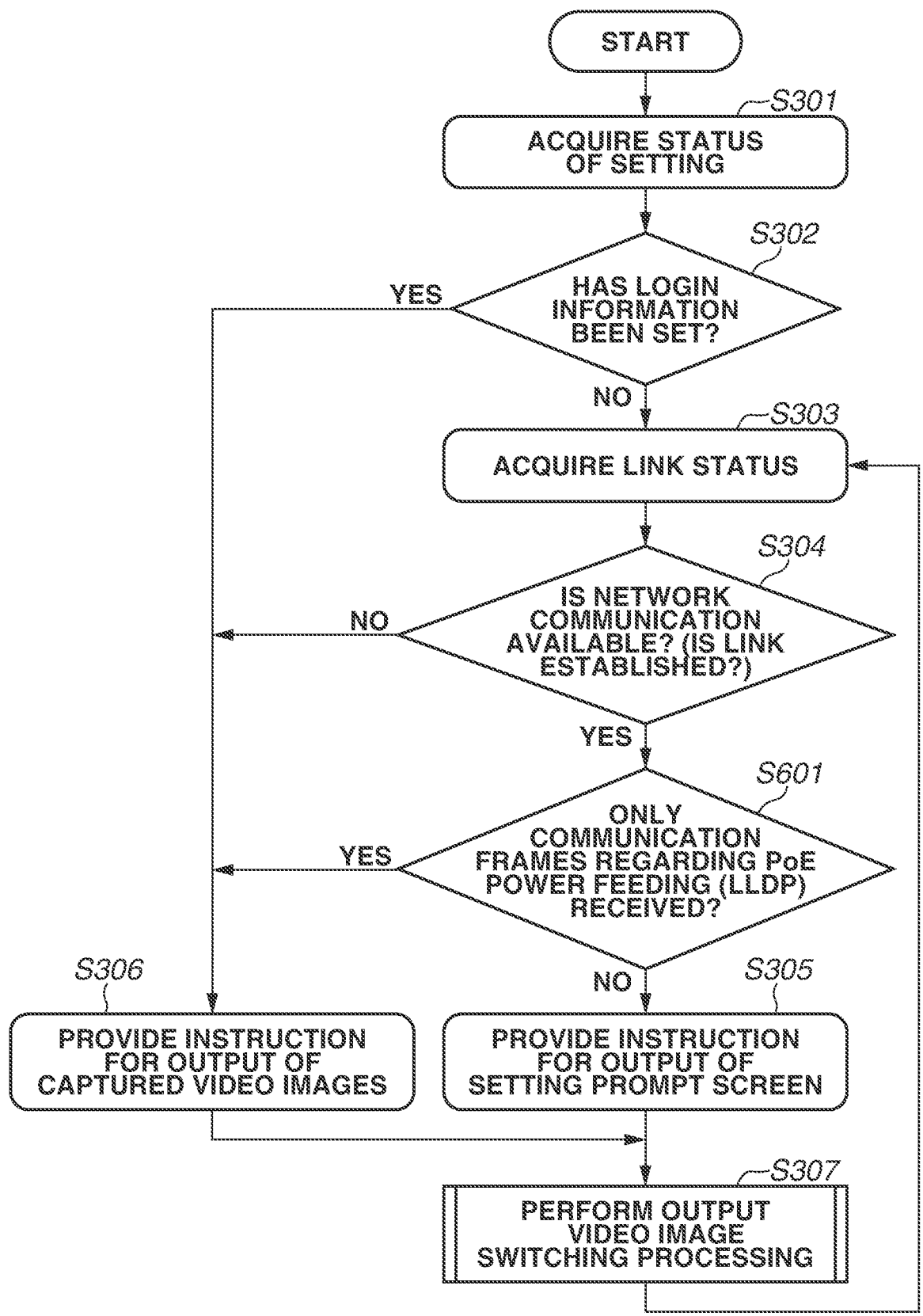

PROCESSING APPARATUS TO INITIALIZE SETTINGS, CONTROL METHOD FOR PROCESSING APPARATUS, AND STORAGE MEDIUM

BACKGROUND

Field of the Disclosure

The present disclosure relates to a processing apparatus, a control method for the processing apparatus, and a storage medium.

Description of the Related Art

There is a technique of making settings for an apparatus via a network. As a technology of this kind, Japanese Patent Application Laid-Open No. 2008-11004 discloses a technique of making initial settings for an apparatus that is connected to a personal computer. In the technique described in Japanese Patent Application Laid-Open No. 2008-11004, the apparatus stores, as screens that can be browsed from a web browser of the personal computer, a login screen that is dedicated to initialization and to which login information is input, and an initialization screen to which an instruction for initialization is input. When the login information input to the screen is authenticated and the instruction for initialization is input to the initialization screen before a predetermined time period elapses after power-ON of the apparatus, initial settings of the apparatus are made.

In the technique described in Japanese Patent Application Laid-Open No. 2008-11004, however, in a case where the initial settings for the apparatus have yet to be made, it is possible to access the initialization screen during the above-mentioned predetermined time period every time the apparatus is powered ON. For this reason, there is a possibility that a third party accesses the initialization screen via the network during the predetermined time period, issues an instruction for initializing the apparatus, and makes the initial settings for the apparatus. However, it may be troublesome for a user who simply uses the apparatus, without connecting the apparatus to a network, to make the initial settings every time the apparatus is powered ON.

SUMMARY

According to an aspect of the present disclosure, a processing apparatus includes one or more processors, and one or more memories including instructions stored thereon that, when executed by the one or more processors, causes the processing apparatus to function as a communication unit configured to perform network communication, a video image output unit configured to output video images, and a control unit configured to perform control including control to output video images from the video image output unit, wherein the control unit performs control to output the video images from the video image output unit based on a status of settings of information to be used at time of login to the processing apparatus and a status of the network communication.

Further features of the present disclosure will become apparent from the following description of embodiments with reference to the attached drawings.

BRIEF DESCRIPTION OF THE DRAWINGS

FIG. 3 is a flowchart describing a first example of processing to be performed by the imaging apparatus.

FIG. 4 is a flowchart describing output video image switching processing in step S307.

FIG. 5 is a diagram schematically illustrating video images output from the imaging apparatus.

FIG. 6 is a flowchart describing a second example of processing to be performed by the imaging apparatus.

DESCRIPTION OF THE EMBODIMENTS

Figure 1:
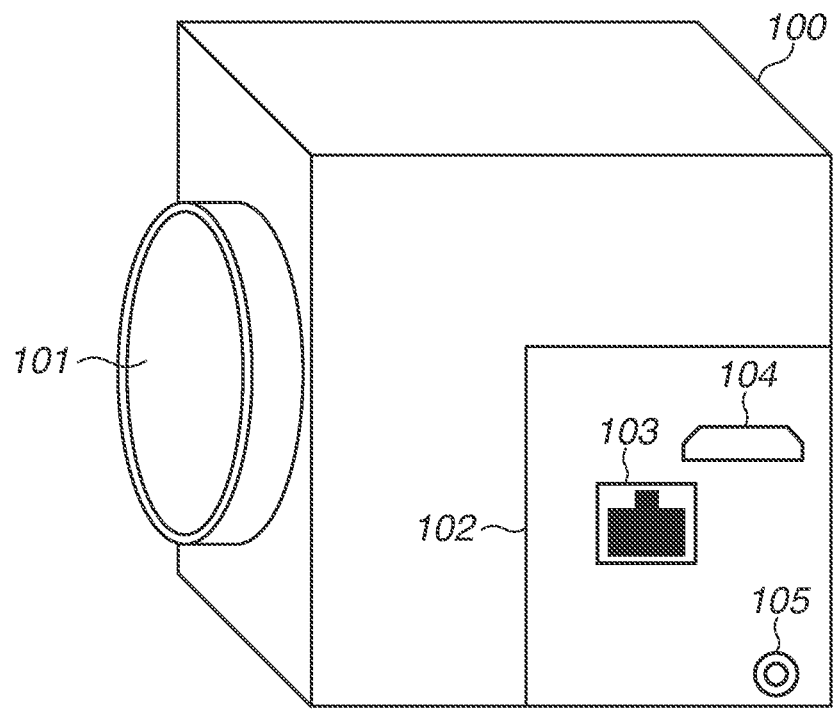
FIG. 1 is a diagram illustrating an outer appearance configuration of an imaging apparatus.

Exemplary embodiments of the present disclosure will be described in detail below with reference to drawings. Configurations described in the following embodiments are merely examples, and the present disclosure is not limited to the configurations illustrated in the drawings.

A first embodiment of the present disclosure will be described in detail below with reference to FIGS. 1 to 5.

FIG. 1 is a diagram illustrating an example of an outer appearance configuration of an imaging apparatus 100. In the present embodiment, a case where the imaging apparatus 100 is a network camera is described as an example.

The imaging apparatus 100 includes an imaging unit 101 and an interface panel 102. The imaging apparatus 100 includes a local area network (LAN) terminal 103, a high-definition multimedia interface (HDMI) (registered trademark) terminal 104, and a direct current (DC) supply terminal 105. FIG. 1 illustrates by an example a case where the LAN terminal 103, the HDMI (registered trademark) terminal 104, and the DC supply terminal 105 are arranged in the interface panel 102.

The imaging unit 101 includes an imaging lens, an image pickup device, and a signal-processing circuit, which are not illustrated. The imaging unit 101 performs various kinds of processing of capturing video images.

The LAN terminal 103 is a communication interface for performing network communication with an external apparatus. A LAN cable is connected to the LAN terminal 103. The LAN terminal 103, for example, accepts an instruction signal based on information input to a web browser or the like that is displayed on an information processing apparatus 240 (for example, a personal computer) illustrated in FIG. 2. The information input to the web browser or the like includes, for example, settings made to the imaging apparatus 100 and contents of an operation performed on the imaging apparatus 100. The LAN terminal 103 outputs a response signal based on a result in response to an instruction signal to the information processing apparatus 240 serving as a transmission source of the instruction signal. The LAN terminal 103 is capable of outputting video images that are captured by the imaging unit 101 and that are packetized using an Internet Protocol (IP).

The HDMI (registered trademark) terminal 104 is an interface for output of video images or the like captured by the imaging unit 101. An HDMI (registered trademark) cable is connected to the HDMI (registered trademark) terminal 104. An external apparatus (display apparatus) is connected to the imaging apparatus 100 via the HDMI cable. Video images, which are converted into those in a predetermined video image format in conformity with an HDMI (registered trademark) standard depending on the external apparatus connected to the imaging apparatus 100, are output from the HDMI (registered trademark) terminal 104.

The DC supply terminal 105 is a terminal for the imaging apparatus 100 to receive DC power supplied from an alternating current (AC) adapter, which is not illustrated. A supply cable is connected to the DC supply terminal 105.

In the present embodiment, a description is given of a case where the imaging apparatus 100 includes the three types of terminals (the LAN terminal 103, the HDMI (registered trademark) terminal 104, and the DC supply terminal 105) as an example. However, the imaging apparatus 100 is only required to include an interface for network communication, and does not necessarily include the LAN terminal 103. The imaging apparatus 100 is only required to include an interface for outputting video images without using network communication, and does not necessarily include the HDMI (registered trademark) terminal 104. For example, the imaging apparatus 100 may include a terminal according to another standard such as a serial digital interface (SDI), a universal serial bus (USB), and DisplayPort. A network may be a wireless network (for example, a wireless LAN) instead of a wired network. Video images may be wirelessly output (for example, through a wireless HDMI). The imaging apparatus 100 is only required to include an interface for receiving power, and does not necessarily include the DC supply terminal 105. For example, the imaging apparatus 100 may include an interface for receiving power through wireless power feeding.

Figure 2:
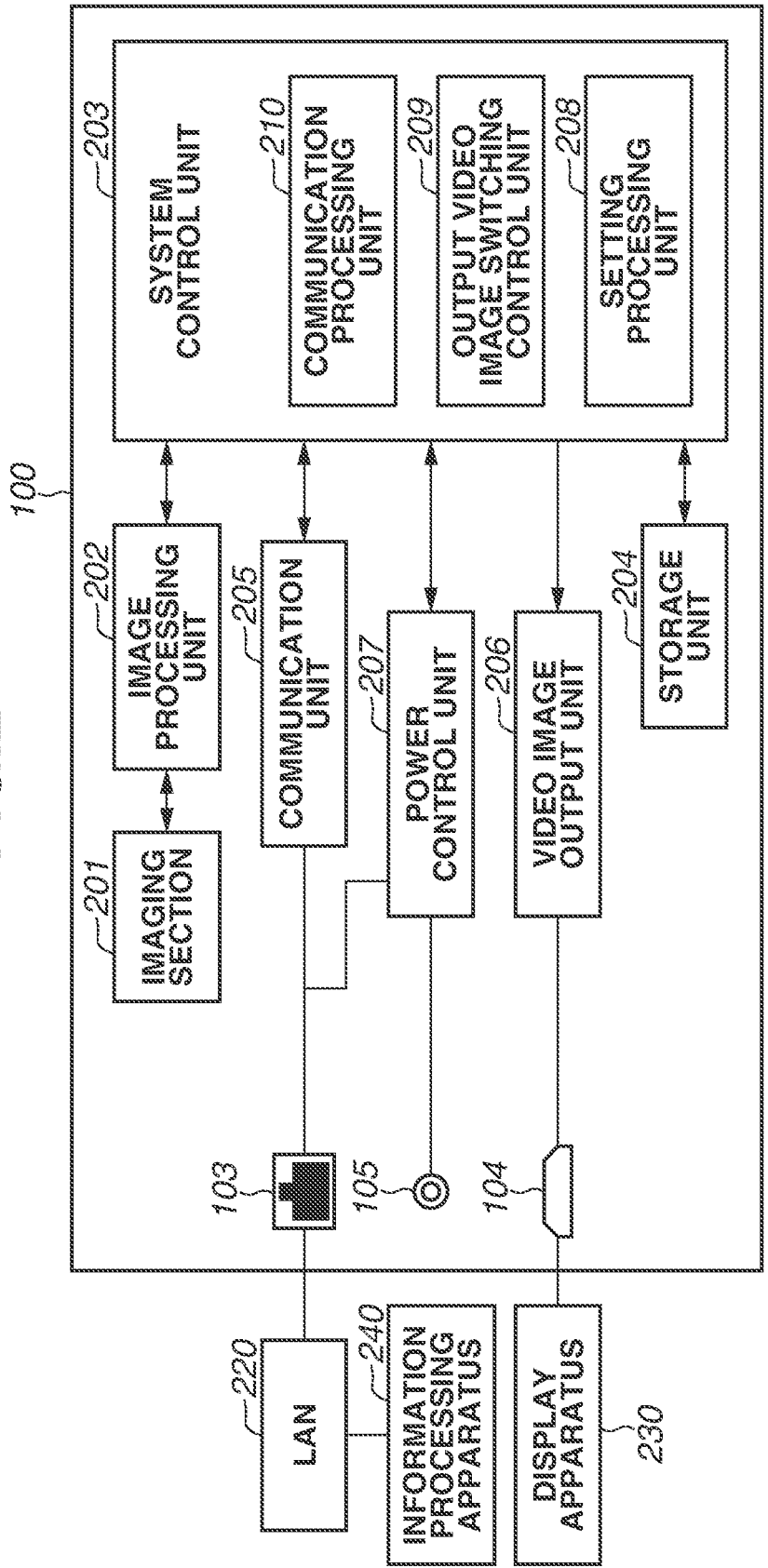
FIG. 2 is a diagram illustrating an internal configuration of the imaging apparatus.

FIG. 2 is a block diagram illustrating an internal configuration example of the imaging apparatus 100 according to the present embodiment.

An imaging section 201 includes an imaging lens, an image pickup device, and a signal-processing circuit. A function of the imaging unit 101 illustrated in FIG. 1 and a function of the imaging section 201 are the same.

The imaging section 201 performs processing including capturing of images of a subject and conversion of captured video images into electric signals, and transmits the electric signals to an image processing unit 202.

The image processing unit 202 performs image processing, such as noise reduction and gamma correction, on the electric signals generated by the imaging section 201 to generate captured image data, and transmits the captured image data to a system control unit 203. In a case where the video images captured by the imaging section 201 are moving video images, frame data (data of each frame) is generated as the captured image data.

The system control unit 203 performs main control of the imaging apparatus 100. For example, the system control unit 203 performs control to transmit the image data generated by the image processing unit 202 to a video image output unit 206. The system control unit 203 provides the image processing unit 202 with an instruction for setting imaging parameters such as a parameter for setting image quality adjustment and parameters for setting a zoom operation and a focus operation performed in the imaging section 201.

The imaging section 201 controls the imaging lens based on the instruction transmitted from the system control unit 203 via the image processing unit 202.

A storage unit 204 stores therein login information to be input when the user logs in to the imaging apparatus 100. In the present embodiment, a case where the login information is identification (ID) and a password is described as an example. The user of the imaging apparatus 100 includes an administrator of the imaging apparatus 100. The storage unit 204 stores therein, for example, ID and a password of the administrator of the imaging apparatus 100 as the ID and password of the user of the imaging apparatus 100. The storage unit 204 stores information regarding settings of the imaging apparatus 100 (contents of the settings and setting values) such as settings of image quality adjustment and settings of output of video images. The imaging apparatus 100 can be started with use of the setting values stored in the storage unit 204 (the start includes a restart).

A communication unit 205 performs processing including transmission/reception processing on communication data. For example, as the transmission/reception processing, the communication unit 205 transmits the communication data received from the LAN terminal 103 via a LAN 220 to the system control unit 203. As the transmission/reception processing, the communication unit 205 transmits, from the LAN terminal 103, the communication data received from the system control unit 203. Furthermore, the communication unit 205 manages information indicating a link status of the LAN 220, communication statistical information, and the like. The system control unit 203 is capable of referring to information managed by the communication unit 205.

The video image output unit 206 outputs video images converted into those in the predetermined video image format in conformity with the HDMI (registered trademark) terminal 104 to a display apparatus 230, which is an external apparatus, via the HDMI (registered trademark) terminal 104. The display apparatus 230 is only required to be an apparatus that is capable of displaying video images to be output from the video image output unit 206. The display apparatus 230 is, for example, an apparatus capable of displaying video images to be displayed in a video image format in conformity with the HDMI (registered trademark) standard.

A power control unit 207 performs control including power input control, which is control regarding power to be supplied to the imaging apparatus 100. For example, the power control unit 207 outputs, to the system control unit 203, at least one of power that is supplied from the DC supply terminal 105 or power that is supplied from the LAN terminal 103 through a Power over Ethernet (PoE).

The system control unit 203 includes a setting processing unit 208, an output video image switching control unit 209, and a communication processing unit 210.

The setting processing unit 208 performs processing including setting processing, which is processing regarding various kinds of settings in the imaging apparatus 100. For example, the setting processing unit 208 performs, as one piece of the setting processing, writing of the setting values to the storage unit 204 and readout of the setting values from the storage unit 204, in response to an instruction received via the communication unit 205. The setting processing unit 208 checks information regarding the settings of the imaging apparatus 100 and stored in the storage unit 204, as one piece of the setting processing.

The output video image switching control unit 209 performs control including video image switching control, which is control regarding switching of video images output from the imaging apparatus 100. The video images subjected to the video image switching control by the output video image switching control unit 209 are output to the outside of the imaging apparatus 100 (to the display apparatus 230) via the video image output unit 206 and the HDMI (registered trademark) terminal 104.

The communication processing unit 210 performs processing including communication processing based on the information managed by the communication unit 205. For example, the communication processing unit 210 determines, as one piece of the communication processing, a status of network communication performed in the communication unit 205 based on the information managed by the communication unit 205.

FIG. 3 is a flowchart describing an example of processing to be performed by the imaging apparatus 100 according to the present embodiment. The flowchart in FIG. 3 describes, among pieces of the processing of the imaging apparatus 100, processing that is necessary for performing switching of display of a video image captured by the imaging section 201 and a setting prompt screen, which is a screen for prompting the user to make settings of the login information. A condition for starting the flowchart in FIG. 3 is not specifically limited. The flowchart in FIG. 3 may be started in a case where a predetermined operation is performed on the imaging apparatus 100, or may be started in another case. The flowchart in FIG. 3 is implemented by, for example, a control apparatus and a calculation apparatus that constitute the system control unit 203 executing processing in accordance with a program stored in an auxiliary memory device that constitutes the storage unit 204 using a main storage device that constitutes the storage unit 204.

In step S301, the setting processing unit 208 reads out the setting values from the storage unit 204 and acquires a status of the settings in the imaging apparatus 100.

In step S302, the setting processing unit 208 performs setting status determination processing. Specifically, the setting processing unit 208 determines, from the status of the settings made in the imaging apparatus 100 and acquired in step S301, whether login information to be input at the time of user's login to the imaging apparatus 100 has been set. For example, the login information is set as below.

The user inputs the login information to the web browser or the like that is displayed on the information processing apparatus 240. As described above, in the present embodiment, a case where the login information includes the ID and the password is described as an example. The system control unit 203 sets the login information by acquiring the login information transmitted from the information processing apparatus 240 via the LAN terminal 103 and the communication unit 205 and storing the login information in the storage unit 204.

The login information is set as one of initial settings of the imaging apparatus 100 made using the web browser (for example, settings made when the imaging apparatus 100 is in a factory default status).

When the login information is set, it is possible to perform user authentication. The user authentication is performed by, for example, inputting the set login information to the web browser that is displayed on the information processing apparatus 240. When the user authentication succeeds, it becomes possible to utilize various kinds of functions of the imaging apparatus 100.

In the present embodiment, a description is given of, as an example, a case where video images captured by the imaging section 201 can be output to the HDMI (registered trademark) terminal 104 by the processing in the flowchart even if the login information has yet to be set. Meanwhile, in the present embodiment, a description is given of, as an example, a case where, when the login information has yet to be set, video images captured by the imaging section 201 are not output to the LAN terminal 103, and network communication for video images captured by the imaging section 201 is not performed.

The login information is not necessarily set in the above-mentioned manner. For example, the login information whose contents are identified by an operation on a user interface included in the imaging apparatus 100 may be input to the imaging apparatus 100.

In a case where the login information has been set as a result of the determination in step S302 (Yes in step S302), the processing proceeds to step S306.

In step S306, the setting processing unit 208 provides an instruction for outputting video images to the output video image switching control unit 209. In step S306, the setting processing unit 208 provides an instruction for outputting video images captured by the imaging section 201 as the instruction for outputting the video images. In step S307, the output video image switching control unit 209 performs output video image switching processing, which is processing of switching video images to be output from the imaging apparatus 100. In a case where the processing proceeds from step S306 to step S307, the output video image switching control unit 209 performs, in step S307, processing of switching video images to be output from the imaging apparatus 100 to video images that have been instructed to be output in step S306, as the output video image switching processing. When the output video image switching processing in step S307 ends, the processing returns to step S303. Details of an example of the output video image switching processing in step S307 will be described below with reference to FIG. 4.

In a case where the login information has been set as a result of the determination in step S302 (No in step S302), the processing proceeds to step S303. In step S303, the communication processing unit 210 acquires a link status of the LAN in the communication unit 205 from the communication unit 205.

In step S304, the communication processing unit 210 performs communication status determination processing. For example, the communication processing unit 210 determines, based on the link status acquired in step S303, whether the imaging apparatus 100 is in a status where network communication can be performed by the communication unit 205. Specifically, the communication processing unit 210 checks whether a link of the Ethernet (registered trademark) has been established (that is, whether the imaging apparatus 100 links up with the Ethernet) to determine whether network communication performed by the communication unit 205 is available.

In a case where the link has been established (YES in step S304), the processing proceeds to step S305. In step S305, the communication processing unit 210 provides an instruction for outputting video images to the output video image switching control unit 209. In step S305, the communication processing unit 210 provides an instruction for outputting a setting prompt screen for prompting the user to make settings of the login information, as the instruction for outputting the video images. In step S307, the output video image switching control unit 209 performs output video image switching processing. In a case where the processing proceeds from step S305 to step S307, the output video image switching control unit 209 performs, in step S307, processing of switching video images to be output from the imaging apparatus 100 to video images that have been instructed to be output in step S306, as the output video image switching processing. When the output video image switching processing in step S307 ends, the processing returns to step S303.

FIG. 4 is a flowchart describing one example of the output video image switching processing in step S307.

In step S402, the output video image switching control unit 209 acquires the instruction for output of the video images in step S305 or S306.

In step S402, the output video image switching control unit 209 determines whether the instruction for outputting the video images, which is acquired in step S401, is the instruction for outputting the setting prompt screen. In a case where the instruction for outputting the video images, which is acquired in step S401, is the instruction for outputting the setting prompt screen as a result of the determination (YES in step S401), the processing proceeds to step S403.

In step S403, the output video image switching control unit 209 switches a source for outputting the video images (a location in which data of the video images to be output from the imaging apparatus 100 is placed) to a message image data region. The message image data region is, for example, part of a storage region of the storage unit 204. Message image data including a message to be displayed on the setting prompt screen is stored in the message image data region. The output video image switching control unit 209 sets information in the message image data region to the video image output unit 206. With this processing, the message image data is output from the video image output unit 206 to the HDMI (registered trademark) terminal 104. When the processing in step S403 ends, the output video image switching processing in step S307 in FIG. 3 ends, and the processing returns to step S303.

In a case where the instruction for outputting the video images, which is acquired in step S401, is not the instruction for outputting the setting prompt screen as a result of the determination in step S402 (NO in step S402), the instruction for outputting the video images, which is acquired in step S401, is the instruction for outputting the video images captured by the imaging section 201. In this case, the processing proceeds to step S404. In step S404, the output video image switching control unit 209 switches the source for outputting the video images to a captured image data region. The captured image data region is, for example, part of the storage region of the storage unit 204. Captured image data generated by the image processing unit 202 is stored in the captured image data region. In a case where moving video images are captured by the imaging section 201, the captured image data generated in the image processing unit 202 is written in the captured image data region and updated as needed. The output video image switching control unit 209 sets information in the captured image data region to the video image output unit 206. With this processing, the captured image data is output from the video image output unit 206 to the HDMI (registered trademark) terminal 104. When the processing in step S403 ends, the output video image switching processing in step S307 in FIG. 3 ends, and the processing returns to step S303.

The above-mentioned output video image switching processing described in the flowchart in FIG. 4 enables switching of video images to be output from the imaging apparatus 100 to either the setting prompt screen or the video images captured by the imaging section 201.

FIG. 5 is a diagram schematically illustrating a video image output from the imaging apparatus 100.

When the instruction for outputting the setting prompt screen is provided, a setting prompt screen 501 including a message indicating that the ID and the password need be set is displayed on the display apparatus 230 that is connected to the end of the HDMI (registered trademark) terminal 104. In this manner, on the setting prompt screen 501 illustrated in FIG. 5, a case where the ID and the password are the login information is described as an example.

When the instruction for outputting the video images captured by the imaging section 201 is provided, in contrast, a video image 502 captured by the imaging section 201 is displayed on the display apparatus 230 that is connected to the end of the HDMI (registered trademark) terminal 104.

In FIG. 5, a double-headed arrow illustrated between the setting prompt screen 501 and the video image 502 captured by the imaging section 201 indicates switching between display of the setting prompt screen 501 and display of the video image 502 captured by the imaging section 201.

As described above, in the present embodiment, the imaging apparatus 100 performs, as control for outputting the video images from the video image output unit 206, control for outputting video images captured by the imaging section 201 based on the status of the settings of the login information and the status of the network communication in the communication unit 205. Hence, it is possible to perform control for outputting the video images captured by the imaging section 201 depending on a case where the network communication in the communication unit 205 is available and a security risk is high, and a case otherwise. It becomes possible to perform control for outputting the video images captured by the imaging section 201 depending on a case where the imaging apparatus 100 is wanted to be used without use of the network communication in a status where the login information is not set by the user and a case otherwise. For example, in a case where the login information has yet to be set and the network communication is unavailable, it is possible to output the video images captured by the imaging section 201 from video image output unit 206 in consideration of the user's convenience. In contrast, in a case where the login information has yet to be set and the network communication is available, it is possible not to output the video images captured by the imaging section 201 from the video image output unit 206 in consideration of the security risk. Hence, it is possible to simultaneously achieve a reduction of the security risk at the time of use of an apparatus capable of performing the network communication and an increase of convenience at the time of use of the apparatus without use of the network communication.

The present embodiment is not limited to a processing apparatus including the imaging unit 101 (imaging section 201), and can be applied to a processing apparatus without the imaging unit 101 (imaging section 201). In this case, for example, the processing apparatus is only required to acquire video images captured by an external imaging apparatus and perform the processing described in the present embodiment using the video images.

A second embodiment is now to be described. In the first embodiment, the description has been given of, as the example, the case where the imaging apparatus 100 displays the setting prompt screen 501 assuming that the security risk is high when the network communication is available. However, even if the network communication is available, the security risk is not high in a case where the status of the network communication in execution is a status of not allowing a third person to impersonate the administrator and set the login information. In this case, even if the network communication is available, the imaging apparatus 100 may display the video image 502 captured by the imaging section 201 in consideration of the user's convenience. In the present embodiment, a description is given of a case where PoE power feeding is performed as a specific example of such a case. In this manner, the present embodiment is different from the first embodiment mainly in part of processing to be performed when the network communication is available in the imaging apparatus 100. Hence, in the following description about the present embodiment, a part that is the same as that in the first embodiment is denoted by the same reference sign, and a detailed description thereof is omitted.

FIG. 6 is a flowchart describing an example of processing of the imaging apparatus 100 according to the present embodiment. The flowchart in FIG. 6 corresponds to the flowchart in FIG. 3, and is partially changed from the flowchart in FIG. 3.

In the flowchart in FIG. 6, processing in step S601 is added to the flowchart in FIG. 3 as processing to be performed after the determination that the link has been established in step S304. In step S601, the communication processing unit 210 determines, at the time of the PoE power feeding, whether the communication unit 205 receives only communication frames regarding the PoE power feeding. This determination is made based on, for example, information managed by the communication unit 205.

In a case where the communication unit 205 has not received only the communication frames regarding the PoE power feeding (i.e. the communication unit 205 has received communication frames other than the communication frames regarding the PoE power feeding) at the time of the PoE power feeding as a result of the determination (No in step S601), the processing proceeds to step S305. In step S305, as described above in the first embodiment, the communication processing unit 210 provides the instruction for outputting the setting prompt screen 501 for prompting the user to make the settings of the login information as the instruction for outputting the video images. In a case where the communication unit 205 has received only the communication frames regarding the PoE power feeding as a result of the determination (Yes in step S601), the processing proceeds to step S306. In step S306, as described above in the first embodiment, the communication processing unit 210 provides the instruction for outputting the video image 502 captured by the imaging section 201 as the instruction for outputting the video images in step S306.

The communication frames regarding the PoE power feeding are communication frames for exchanging information regarding power feeding between equipment on the power feeding side, which is not illustrated, and the imaging apparatus 100. For example, there is a protocol for a data link layer such as a Link Layer Discovery Protocol (LLDP). Communication through the protocol called the LLDP is performed by information exchange between a power feeding side and a power receiving side, and thereby used for determining an amount of power feeding needed and maintaining a status of power feeding. The communication frames regarding the PoE power feeding are communicated through the LLDP. In a case where the communication through the LLDP is performed, the imaging apparatus 100 cannot receive IP packets. The login information is transmitted not through the LLDP but by the IP packets. Hence, in a case where the communication unit 205 has received only the communication frames regarding the PoE power feeding, the imaging apparatus 100 cannot set the login information. On the other hand, in a case where the communication unit 205 has not received only the communication frames regarding the PoE power feeding, there is a possibility that the imaging apparatus 100 receives the IP packets and sets the login information for a third person.

As described above, in the present embodiment, in a case where the imaging apparatus 100 is receiving the PoE power feeding from the LAN terminal 103, the imaging apparatus 100 determines whether an environment is where communication other than the communication regarding the PoE power feeding (for example, IP communication) occurs. In a case where the environment is where only the communication regarding the PoE power feeding occurs, the imaging apparatus 100 outputs the video image 502 captured by the imaging section 201. On the other hand, in a case where communication other than the communication regarding the PoE power feeding occurs, the imaging apparatus 100 outputs the setting prompt screen 501. Hence, the convenience can be further increased when the apparatus capable of performing the network communication is used without use of the network communication, in addition to the effects described in the first embodiment.

The status of the network communication in execution is not limited to a status of presence/absence of communication other than the communication regarding the PoE power feeding at the time of the PoE power feeding. For example, the imaging apparatus 100 may determine whether the IP packets are received regardless of whether the PoE power feeding is performed, and thereby determine whether the network communication is performed in a status where the login information cannot be set. Since the login information is transmitted by the IP packets as described above, there is a possibility that the IP packets include the login information. Hence, in a case where the IP packets are received in the network communication in execution, the network communication is performed in a format in which the login information can be set, and the security risk is relatively high. On the other hand, in a case where no IP packet is received in the network communication in execution, the network communication is not performed in the format in which the login information can be set, and the security risk is relatively low. Hence, the imaging apparatus 100 outputs the setting prompt screen 501 in the former case, and outputs the video image 502 captured by the imaging section 201 in the latter case.

In the present embodiment, the various modifications described in the first embodiment may be adopted.

Other Embodiments

The present disclosure can also be implemented by installation of a program that implements one or more functions of the embodiments described above in a system or an apparatus via a network or a storage medium, and processing by one or more processors in the system or a computer of the apparatus to load and execute the program. Furthermore, the present disclosure can also be implemented by a circuit (e.g., application-specific integrated circuit (ASIC)) that implements one or more functions.

Each of the embodiments described above is merely a concrete example for implementing the present disclosure, and the technical scope of the present disclosure should not be interpreted as being limited to the embodiments. That is, the present disclosure can be implemented in various modes without departing from the technical idea or the principal features of the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-064569, filed Apr. 8, 2022, which is hereby incorporated by reference herein in its entirety.

What is claimed is:

1. A processing apparatus comprising:
   one or more processors; and
   one or more memories storing instructions that, when executed by the one or more processors, causes the processing apparatus to function as:
   a communication unit configured to perform network communication;
   a video image output unit configured to output video images; and
   a control unit configured to perform control including control to output the video images from the video image output unit,
   wherein the control unit does not enable the control to output the video images, in a case where i) settings of information to be used to log in to the processing apparatus have not been made and ii) a link of the network communication has been established, and
   the control unit enables the control to output the video images in a case where i) the settings of information to log in to the processing apparatus have not been made and ii) the link of the network communication has not been established.

2. The processing apparatus according to claim 1, wherein the control unit performs control to output the video images and control to output a screen to prompt making of the settings in the case where i) the settings of information to be used to log in to the processing apparatus have not been made and ii) the link of the network communication has been established.

3. The processing apparatus according to claim 1, wherein the control unit determines whether to enable the control based on a status of the network communication including a status of the network communication in execution.

4. The processing apparatus according to claim 3, wherein the status of the network communication in execution includes whether the network communication in execution is communication in a format in which the settings can be made.

5. The processing apparatus according to claim 3, wherein, when power feeding to the processing apparatus is performed via the communication unit, the status of the network communication in execution includes whether communication other than communication regarding the power feeding is performed in the network communication in execution.

6. The processing apparatus according to claim 1, further comprising:
   a setting status determination unit configured to determine a status of the settings; and
   a communication status determination unit configured to determine a status of the network communication.

7. The processing apparatus according to claim 6, wherein the communication status determination unit is configured to determine the status of the network communication based on a link status of the communication unit.

8. The processing apparatus according to claim 1, wherein the settings are made when the processing apparatus is in an initial status.

9. The processing apparatus according to claim 1, further comprising an imaging unit.

10. A non-transitory storage medium storing a program that causes a computer to function as the processing apparatus according to claim 1.

11. A control method for a processing apparatus, the control method comprising:
   performing network communication;
   outputting video images; and
   performing control including control to output the video images in the outputting of the video images,
   wherein, the control to output the video images is not enabled, in a case where i) settings of information to be used to log in to the processing apparatus have not been made and ii) a link of the network communication has been established, and
   the control to output the video images is enabled, in a case where i) the settings of information to log in to the processing apparatus have not been made and ii) the link of the network communication has not been established.

* * * * *